(12) United States Patent
Mahesh et al.

(10) Patent No.: US 8,135,195 B2
(45) Date of Patent: Mar. 13, 2012

(54) SYSTEMS AND METHODS FOR SYNCHRONIZED IMAGE VIEWING WITH AN IMAGE ATLAS

(75) Inventors: Prakash Mahesh, Hoffman Estates, IL (US); Vijaykalyan Yeluri, Sunnyvale, CA (US); Denny Wingchung Lau, Redwood City, CA (US); Steven P. Roehm, Waukesha, WI (US); Christopher Allen Beaulieu, Los Altos, CA (US); Garry Evan Gold, Stanford, CA (US); Sandip Biswal, Stanford, CA (US); Robert John Herfkens, Stanford, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/171,217

(22) Filed: Jun. 28, 2011

(65) Prior Publication Data
US 2011/0255760 A1    Oct. 20, 2011

Related U.S. Application Data

(63) Continuation of application No. 11/924,992, filed on Oct. 26, 2007, now Pat. No. 7,995,818.

(60) Provisional application No. 60/867,003, filed on Nov. 22, 2006.

(51) Int. Cl.
*G06K 9/00* (2006.01)
*A61B 5/05* (2006.01)

(52) U.S. Cl. .......... 382/128; 382/294; 600/424
(58) Field of Classification Search .......... 382/100, 382/128, 129, 130, 131, 132, 133, 134, 168, 382/173, 181, 189, 232, 254, 260, 274, 276, 382/305, 312, 294; 378/21, 28; 600/426, 600/424; 235/375
See application file for complete search history.

(56) References Cited

U.S. PATENT DOCUMENTS

| | | | |
|---|---|---|---|
| 6,490,475 B1 * | 12/2002 | Seeley et al. | 600/426 |
| 7,130,457 B2 * | 10/2006 | Kaufman et al. | 382/128 |
| 7,494,045 B2 * | 2/2009 | Menhardt et al. | 235/375 |
| 7,545,967 B1 * | 6/2009 | Prince et al. | 382/130 |
| 7,668,358 B2 * | 2/2010 | Snoeren et al. | 382/131 |
| 7,697,972 B2 * | 4/2010 | Verard et al. | 600/424 |
| 7,747,050 B2 * | 6/2010 | Lau et al. | 382/128 |

* cited by examiner

*Primary Examiner* — Seyed Azarian
(74) *Attorney, Agent, or Firm* — Hanley, Flight & Zimmerman, LLC

(57) ABSTRACT

Certain embodiments of the present invention provide methods and systems for synchronizing a view of a patient image with an atlas image. Certain embodiments provide a method for synchronizing a patient image with an atlas image. The method includes retrieving an image atlas including at least one atlas image, registering an atlas image to a patient image and synchronizing a view of the atlas image to a view of the patient image. In certain embodiments, the method further includes registering a plurality of atlas images to a plurality of patient images. In certain embodiments, the step of synchronizing further includes synchronizing at least one of orientation, zoom level, window level and pan of the atlas image to the patient image.

18 Claims, 3 Drawing Sheets

1. Internal carotid artery
2. Vertebral artery
3. Cavernous sinus
4. Carotid canal
5. Anterior cerebral artery
6. Posterior cerebral artery

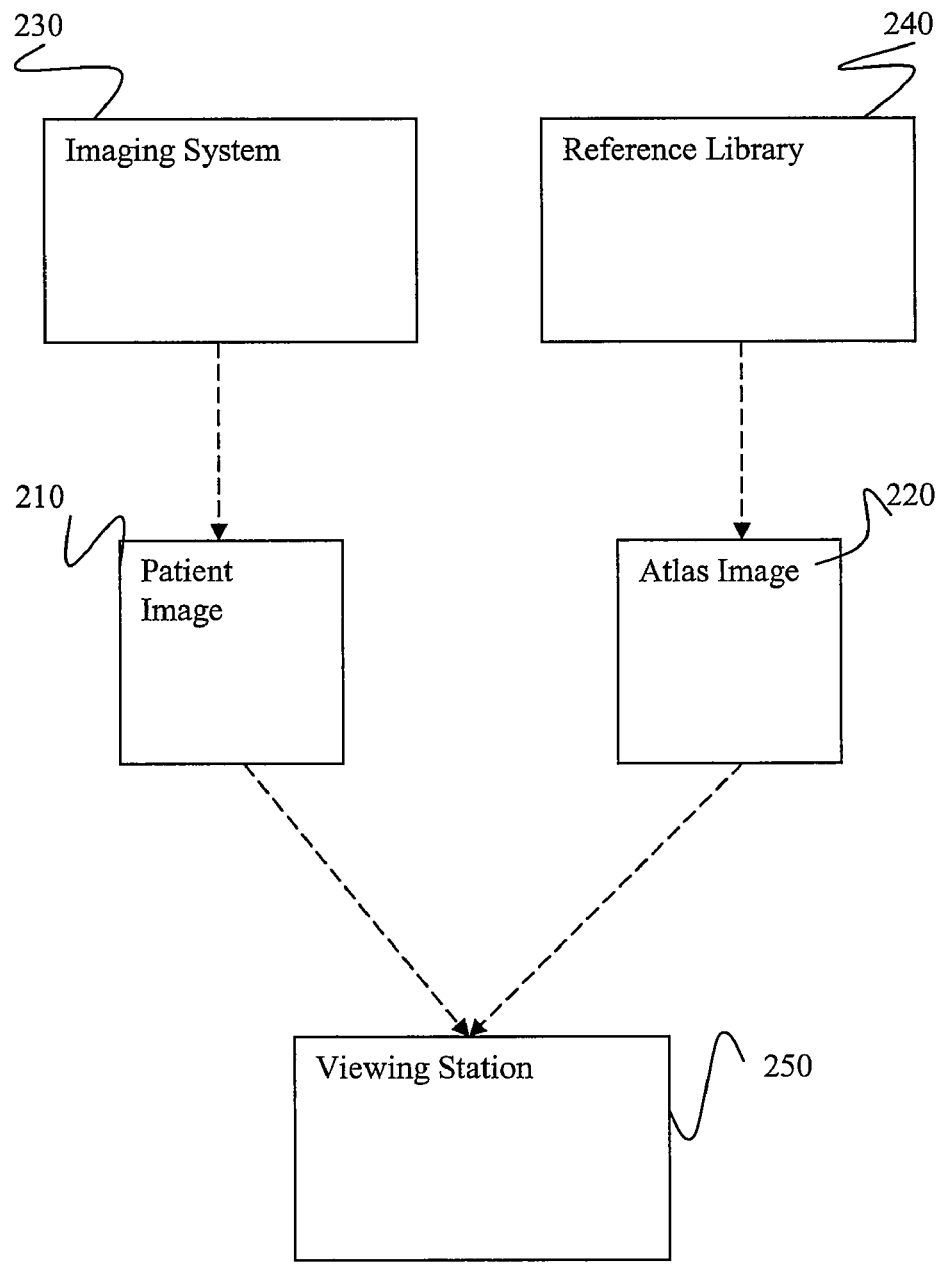

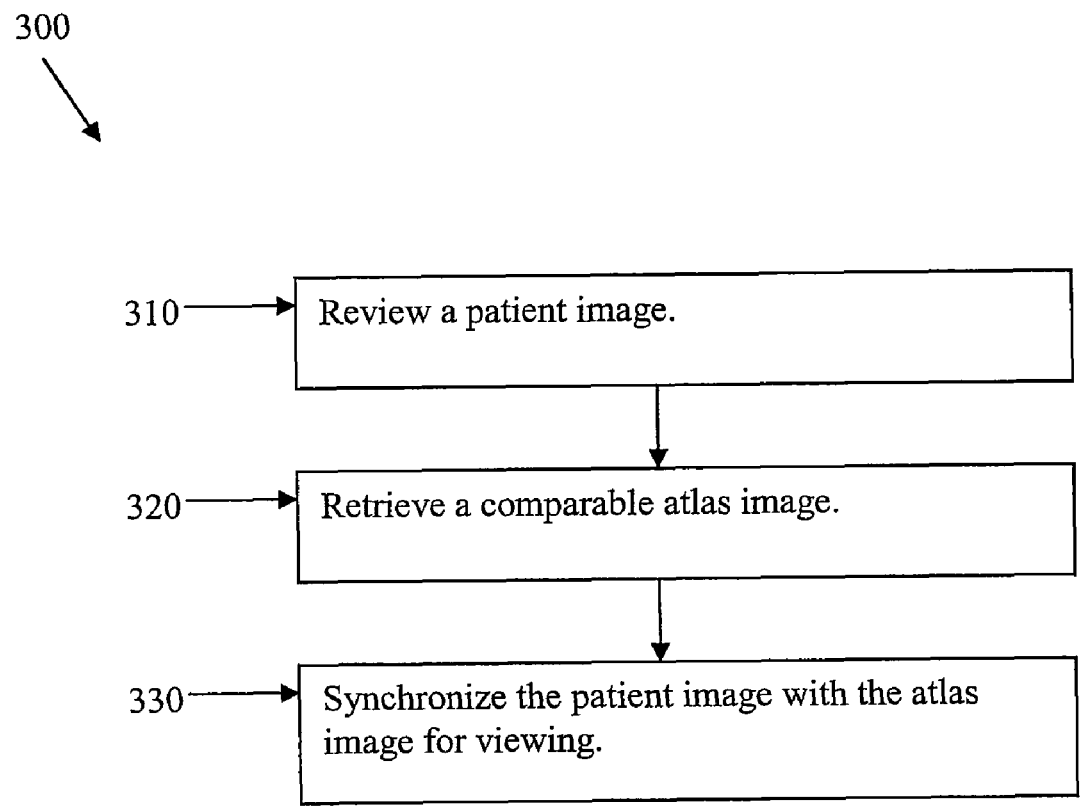

SYSTEMS AND METHODS FOR SYNCHRONIZED IMAGE VIEWING WITH AN IMAGE ATLAS

CROSS-REFERENCE TO RELATED APPLICATIONS

The present application claims the benefit of priority as a continuation to co-pending U.S. patent application Ser. No. 11/924,992, filed on Oct. 26, 2007, entitled "SYSTEMS AND METHODS FOR SYNCHRONIZED IMAGE VIEWING WITH AN IMAGE ATLAS", and also claims the benefit of priority to U.S. Provisional Patent Application No. 60/867,003, filed on Nov. 22, 2006, entitled "SYSTEMS AND METHODS FOR SYNCHRONIZED IMAGE VIEWING WITH AN IMAGE ATLAS", each of which is herein incorporated by reference in its entirety.

BACKGROUND OF THE INVENTION

The present invention generally relates to improved image analysis and workflow. In particular, the present invention relates to synchronized image viewing with an image atlas to improve image analysis and workflow.

When radiologists are interpreting images, they may encounter some anatomical structure with which they may not be familiar. A radiologist's unfamiliarity may be due to the fact that he or she is interpreting images in which he or she does not specialize. Unfamiliarity may also be due a deviation from normal in a patient's anatomy because of disease or trauma.

When faced with uncertainty about anatomical structures, it would be highly desirable for radiologists to refer to an image atlas to help visualize normal anatomy. Radiologists may then infer anatomical structures in a patient's image study. Currently, referring to an image atlas requires a radiologist to search through a physical or electronic resource. Additionally, if a radiologist is visualizing images at an orientation that is different from that of images from the atlas, the radiologist has to reorient the images from the atlas to the orientation of the patient's images.

Image registration is used for medical image viewing applications. Registration is a process of correlating two coordinate systems, such as a patient image coordinate system and an electromagnetic tracking coordinate system. Several methods may be employed to register coordinates in imaging applications. "Known" or predefined objects are located in an image. A known object includes a sensor used by a tracking system. Once the sensor is located in the image, the sensor enables registration of the two coordinate systems.

Thus, there is a need for systems and methods for improved image review and analysis. There is a need for systems and methods for combining reference image data with viewing of patient images.

BRIEF SUMMARY OF THE INVENTION

Certain embodiments of the present invention provide methods and systems for synchronizing a view of a patient image with an atlas image.

Certain embodiments provide a method for synchronizing a patient image with an atlas image. The method includes retrieving an image atlas including at least one atlas image, registering an atlas image to a patient image and synchronizing a view of the atlas image to a view of the patient image. In certain embodiments, the method further includes registering a plurality of atlas images to a plurality of patient images. In certain embodiments, the step of synchronizing further includes synchronizing at least one of orientation, zoom level, window level and pan of the atlas image to the patient image.

Certain embodiments provide an image viewing system displaying a patient image with an atlas image. The system includes a viewing station for viewing a medical image. The viewing station is configured to view one or more patient images in conjunction with one or more atlas images. The viewing station includes a processor configured to retrieve an image atlas including at least one atlas image relating to a patient image for display. The processor registers the at least one atlas image to at least one patient image and synchronizes a view of the at least one atlas image to a view of the at least one patient image.

Certain embodiments provide a computer readable medium having a set of instructions for execution on a computer. The set of instructions includes an image atlas retrieval routine for retrieving an image atlas including at least one atlas image. The set of instructions also includes a registration routine for registering an atlas image to a patient image. The set of instructions further includes a synchronization routine for synchronizing a view of the atlas image to a view of the patient image.

BRIEF DESCRIPTION OF SEVERAL VIEWS OF THE DRAWINGS

FIG. 2 illustrates an image viewing system used in accordance with an embodiment of the present invention.

FIG. 3 illustrates a flow diagram for a method for image analysis in accordance with an embodiment of the present invention.

Figure 1:
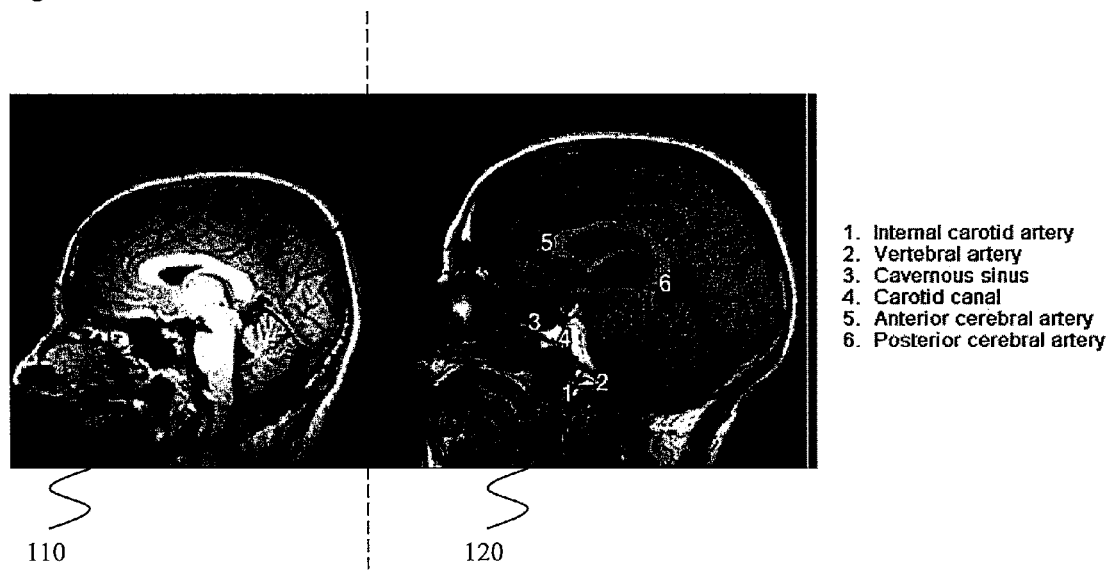
FIG. 1 illustrates a comparison of a patient image and an atlas image in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

In certain embodiments, images are presented to radiologists and/or other viewers to approximate the presentation of images from a patient's study. An appropriate atlas is selected based on an image study being presented to a radiologist or other viewer for interpretation. If the study is a computed tomography (CT) head study of a male adult, for example, then an image atlas of a CT head scan of a male adult of comparable height and weight is presented with one or more views such as axial, sagittal, coronal and/or oblique. Atlas images may be displayed at a zoom level and image window level comparable to that of the patient study, for example.

In certain embodiments, images between the atlas and the study are registered. Since the images are registered between the two sets, an image from the atlas may be selected for display to correspond with an image being viewed from the patient study. Thus, the view of the patient study is essentially synchronized with the view of the atlas. In certain embodiments, images from the atlas are labeled. Therefore, if a radiologist or other viewer wants additional understanding of anatomical structures, the radiologist or other viewer can refer to an image atlas.

For example, as shown in FIG. 1, a patient image 110 on the left is synchronized with an atlas image 120 on the right. Settings of the atlas image 120, such as a zoom, window level, pan, orientation and/or other presentation state, are synchronized with those of the patient image 110, for example. Atlas image 120 may be labeled with identifying reference(s), such as internal carotid artery 1, vertebral artery 2, cavernous sinus 3, carotid canal 4, anterior cerebral artery 5 and posterior cerebral artery 6.

In certain embodiments, a user viewing the patient image 110 concurrently sees the atlas image 120, and the atlas image 120 may aid in his or her review and analysis of the patient image 110. The user may refer to identified anatomy (e.g., 1, 2, 3, 4, 5, 6) in the atlas image 120 to help interpret anatomy in the patient image 110. Additionally, differences between anatomy in the patient image 110 and the atlas image 120 may become more apparent through a side-by-side comparison, for example.

FIG. 2 illustrates an image viewing system 200 used in accordance with an embodiment of the present invention. The components of the system 200 may be implemented in software, hardware and/or firmware separately and/or in various combinations, for example. In the system 200, a user may view one or more images via an image viewing station 250, such as a PACS workstation, RIS/PACS station, and/or other terminal/viewing application. Images may include a patient image 210 and an atlas image 220, for example.

The user may retrieve the patient image 210 from an imaging system 230 and/or image archive (e.g., PACS, etc.) via the viewing station 250, for example. The user may retrieve the atlas image 220 from a reference library 240, image atlas and/or other storage, for example. The user may then view the patient image 210 with the atlas image 220 to help in analysis of the patient image 210. In certain embodiments, the user and/or viewing station 250 may orient and/or otherwise adjust the atlas image 220 to correlate with the patient image 210.

FIG. 3 illustrates a flow diagram for a method 300 for image analysis in accordance with an embodiment of the present invention. At step 310, a patient image is obtained for review. For example, a CT image of a made adult head is obtained and sent to a radiologist for review. At step 320, a corresponding atlas image is retrieved for viewing with the patient image. For example, a reference or atlas image of a head of a male adult of comparable height and weight is retrieved from an image atlas or library. At step 330, the atlas image is modified to correspond with the patient image. For example, the patient image and atlas image are registered, and the views are synchronized such that the view of the atlas image corresponds at least roughly to the view of the patient image.

In certain embodiments, a reference or atlas set of images may be collected and stored at a PACS or other image data storage, for example. Reference images may be an aggregated set of references or "gold standard" images and/or may be organized for a particular patient, for example. For example, five sets of images may serve as a reference set for acquired image data. Images in the reference set(s) are labeled with major anatomy or other feature(s) in each image. Once image registration has been performed, acquired image studies, such as newly acquired radiology image studies, may automatically be labeled based on the labels found in the reference image set(s). Labels may be correlated for newly acquired images at a patient level, organ level, etc. For example, a liver may be identified in a newly acquired image based on registration between the newly acquired image and one of the reference images. A label assigned to a structure, such as a liver, in the reference image(s) is assigned to the corresponding structure in the acquired image.

In an embodiment, a user may navigate through a plurality of images based on labels assigned to one or more features in the images. Thus, a user may navigate set of images by anatomy, such as by organ. Alternatively, a user may navigate a set of images by patient and/or by other criterion.

In an embodiment, a library of standard or typical scans may be classified by one or more characteristic, such as modality, patient, gender, weight, height, age, ethnicity, ailment, etc. Any number of images may be included and classified in the library. A reference set of images may be selected from the library based on one or more characteristics. A PACS may automatically match a reference set to the desired characteristic(s) based on data input at time of image acquisition, for example. In an embodiment, the system may include more than one reference image set based on patient characteristics. Combinations of patient characteristics may represent different reference sets, for example. In an embodiment, a newly acquired image exam may be categorized based on different characteristics associated with a reference image set.

In an embodiment, clinical information may be displayed based on anatomy. For example, a patient may have pathology, lab results, microbiology, historical data, etc. as well as images. When a radiology or other healthcare practitioner is examining images, he or she may wish to also consider clinical information, such as test results, etc. Additionally, results may only be relevant to certain parts of anatomy. If a PACS determines which images and/or anatomy a practitioner is reviewing, the PACS may automatically display relevant results. A PACS or other system may map results and/or other data with relevant anatomy. The PACS registers viewed image(s) to reference image(s). Based on registration, the PACS may determine anatomy and retrieve relevant data mapped to and/or otherwise associated with the anatomy.

In certain embodiments, the reference or atlas image set may include one or more images obtained from CT, MR, digital radiography ("DR"), x-ray, ultrasound, nuclear, single phone emission computed tomography ("SPECT"), positron emission tomography ("PET"), and/or other imaging systems. For example, the image atlas may include one or more images depicting a plurality of anatomy, such as liver, pancreas, kidneys, and/or large intestine, in an image. The image atlas may include one or more subsets of images. In an embodiment, the image atlas and/or a subset of the image atlas may be organized by anatomy, malady, patient, and/or other criterion. The acquired patient image set and/or a subset of the acquired image set may also be organized by anatomy, malady, patient, and/or other criterion, for example. The image atlas may include anatomical structure information such as patient clinical information, reference sources, disease processes, images, drug interactions, and/or other information.

The image atlas may be used to correlate anatomical structures depicted in image(s) to relevant clinical information from one or more sources. Image registration techniques, such as cross correlation, minimization of variance, mutual information, principal axes, manual registration, and/or other registration technique, may be used to correlate image(s) and/or points within the image(s) in the acquired patient image set with images and/or points in the image atlas. Anatomical information contained in the image atlas describes image content in the image atlas. An image registration module may be used to register the acquired patient image set with respect to the reference image atlas. The image registration module may be implemented on a PACS workstation, PACS server, image viewer, and/or other processor, for example.

Image registration, display, and/or other functionality may be implemented in hardware, firmware, and/or as a set of instructions in software, for example.

Once the acquired patient image set has been registered, the image atlas may be used to retrieve relevant clinical data or other information. Relevant anatomical or clinical data may include patient clinical information, reference sources, disease or other malady processes, related image(s), drug interaction information, and/or other information, for example.

Certain embodiments automate matching of images to previous exam images using registration techniques that allow a mapping between two exams based on anatomy, for example. A registration algorithm may include several parameters including a metric value, for example. The metric value is a measure of similarity between two images. A correlation between two image slices may be directly related to the metric value. Current and previous exam image sets may include one or more images obtained from CT, MR, digital radiography ("DR"), x-ray, ultrasound, nuclear, single phone emission computed tomography ("SPECT"), positron emission tomography ("PET"), and/or other imaging modalities, for example.

Similarity between images may be computed using a variety of metrics. For example, a mean square image to image metric may be used to compute image similarity. The mean square image to image metric quantitatively measures how well a transformed moving image fits a fixed image by comparing a gray-scale intensity of the images. A lower metric value indicates higher correlation between the image slices.

For example, using a mean square difference metric, an image A is compared to images B and C in a previous image set. Each pixel in image A is compared to a corresponding pixel in each of image B and image C. Differences between pixel values are summed for each image and squared. A match metric value for images A and B is then computed by dividing the sum of difference values by the total number of pixels. A match metric value for images A and C is also computed accordingly. A lower metric value indicates fewer differences in pixel values between the images and, therefore, a higher correlation between the images.

Alternatively or in addition, a mutual information metric may be used to compute similarity between images. The mutual information metric measures how much information one random variable (e.g., image intensity in one image) tells about another random variable (e.g., image intensity in the other image).

For example, mutual information may be calculated from a histogram of image intensities for a pair of images A and B. The mutual information metric measures the information shared by image intensity values for pixels in image A and image intensity values for corresponding pixels in image B. A histogram of images intensities for images A and B may show the similarities and differences between image intensities for images A and B. If images A and B are independent, then the mutual information metric value is zero. If images A and B are identical, then image intensities in image A are no different from image intensities in image B, and no new information is added. Mutual information measurements may be used to identify whether image B is the most similar previous image corresponding to image A, for example.

Alternatively or in addition, other metrics, such as normalized correlation, mean reciprocal square difference, cross correlation, minimization of variance, principal axes, manual registration, and/or other registration technique, may be used to identify similar images. In certain embodiments, images of different modalities may be registered using a plurality of metrics.

Images may be registered in a variety of ways in order to apply one or more metrics discussed above. Registration techniques may include two-dimensional (2D) axial slice to slice registration and reformat, maximum intensity projection (MIP) and/or scout registration, for example. For a given current and previous exam pair in 2D axial slice to slice registration, each image in the current exam is registered with each image in the previous exam. For example, image slices from the current exam and a previous exam are transformed to a reference coordinate system. Pixel values between the image slices may be compared according to a variety of metrics, including the metrics described above. Corresponding pairs may be identified based on the metric value. For example, an image pair with the lowest metric value is a matching pair. Each image in the current exam may be registered with an image from a previous exam or atlas accordingly.

Using reformat/MIP/scout registration, for example, coronal or sagittal reformats, MIPs and/or scout images may be generated for the current and previous exams using 2D axial images. Then, using an appropriate translation-rotation transform, the reformat/MIP/scout image(s) for the current exam are registered to the reformat/MIP/scout image(s) for the previous exam. The X and Y coordinate translation values after reformat/MIP/scout registration define a relationship between physical coordinates of the 2D axial images.

For example, an axial image may be reformatted with respect to a certain plane, such as a sagittal or coronal plane. Additionally, an axial image may be analyzed for brightest texture elements (texels) at each pixel location in the image. Furthermore, one or more overview or scout image(s) may be used for comparison with axial image slices. A combination of translation and/or rotation may be used to map pixels in the images to a reference coordinate system. Then images from the current and previous exams may be registered and compared.

Registration and image matching may be computed prior to display of the images on a PACS workstation. When a radiologist or other user opens an exam, hanging protocols may automatically open related previous exams. Using a matching table generated during registration, the radiologist is able to click a button or otherwise select and automatically link images from current and previous exams based on anatomy. Thus, correlation between images from a new exam and images from a previous exam may be performed automatically without manual intervention.

Radiologists and/or other users may link a current exam with multiple previous exams and cine or scroll through exam images with respect to anatomy rather than image number. Images may be synchronized based on a table or other reference listing generated from registering the current exam with the previous exams. A PACS workstation, PACS server, and/or other processing system may be used to automatically determine correlation of images from a patient's previous exam to a new unread exam. In certain embodiments, a user may review linked exam images based on vocal or subvocal command, eye tracking, selection by mousing device, and/or other technique, for example.

In an embodiment, clinical information may also be displayed based on anatomy. For example, a patient may have pathology, lab results, microbiology, historical data, etc. as well as images. When a radiology or other healthcare practitioner is examining images, he or she may wish to also consider clinical information, such as test results, etc. Additionally, results may only be relevant to certain parts of anatomy. If a PACS determines which images and/or anatomy a practitioner is reviewing, the PACS may automatically display relevant results. A PACS or other system may map results and/or other data with relevant anatomy. The PACS registers viewed image(s) to reference image(s). Based on registration, the PACS may determine anatomy and retrieve relevant data mapped to the anatomy.

Image registration and correlation may be facilitating using a PACS and/or other processing system, for example. Images and/or related data may be stored in a clinical information system or archive, for example. In an embodiment, a matching table, database, or other memory structure may indicate and/or be used to help indicate a mapping between a current image and an atlas or other historical image, for example.

In certain embodiments, when one or more atlas images are registered with one or more patient images, a metric value is generated from each registration that indicates a similarity between the two images. In certain embodiments, a lower metric value indicates a higher correlation. In certain embodiments, a higher metric value may indicate a higher correlation. Synchronization of patient and atlas images may be identified based at least in part on the metric value. In certain embodiments, mapping and synchronization between patient and atlas image(s) may be stored for later use or retrieval.

Thus, certain embodiments provide reference information with anatomical context having different views of a three-dimensional dataset. Certain embodiments synchronize a view of an image atlas to that of a patient image(s) based on prior image registration to improve ease of comparison between atlas image and patient image. Certain embodiments provide a technical effect of synchronizing patient image(s) with atlas image(s) for improved, reference, understanding and comparison to aid in diagnosis and treatment.

Certain embodiments present images from an image atlas to radiologists and/or other clinicians in a manner similar to how images from a patient's study are presented. An appropriate atlas is chosen based on the study being presented to the radiologist for interpretation. For example, an atlas image of corresponding anatomy, angle, dimension, etc., may be selected for viewing in conjunction with a patient image of that anatomy, angle, dimension, etc. The atlas images may also be displayed at the same zoom level and image window level normalized. Because the images between the atlas and the study are registered, the corresponding image from the atlas can be selected to be displayed for the radiologist. Therefore, the view of the patient study is essentially synchronized with the view of the atlas. In certain embodiments, since the images from the atlas are labeled, if the radiologist needs to understand the anatomical structures better, then the radiologist can easily refer to an image atlas.

Several embodiments are described above with reference to drawings. These drawings illustrate certain details of specific embodiments that implement the systems and methods and programs of the present invention. However, describing the invention with drawings should not be construed as imposing on the invention any limitations associated with features shown in the drawings. The present invention contemplates methods, systems and program products on any machine-readable media for accomplishing its operations. As noted above, the embodiments of the present invention may be implemented using an existing computer processor, or by a special purpose computer processor incorporated for this or another purpose or by a hardwired system.

As noted above, embodiments within the scope of the present invention include program products comprising machine-readable media for carrying or having machine-executable instructions or data structures stored thereon. Such machine-readable media can be any available media that can be accessed by a general purpose or special purpose computer or other machine with a processor. By way of example, such machine-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represents examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, mini-computers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. For example, the set of instructions may include an image atlas retrieval routine for retrieving an image atlas including at least one atlas image. The set of instructions may also include a registration routine for registering an atlas image to a patient image. The set of instructions may further include a synchronization routine for synchronizing a view of the atlas image to a view of the patient image, for example.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

Those skilled in the art will appreciate that the embodiments disclosed herein may be applied to the formation of any image registration, display and analysis system. Certain features of the embodiments of the claimed subject matter have been illustrated as described herein; however, many modifications, substitutions, changes and equivalents will now occur to those skilled in the art. Additionally, while several functional blocks and relations between them have been described in detail, it is contemplated by those of skill in the art that several of the operations may be performed without the use of the others, or additional functions or relationships between functions may be established and still be in accordance with the claimed subject matter. It is, therefore, to be understood that the appended claims are intended to cover all such modifications and changes as fall within the true spirit of the embodiments of the claimed subject matter.

The invention claimed is:

1. A computer-implemented method for synchronizing a patient image with an atlas image, said method comprising:
   selecting, automatically using a processor, an image atlas based on an image study to be presented, the image atlas comparable to the image study;
   registering, using a processor, an atlas image from the image atlas to a patient image from the image study;
   labeling, using a processor, components in the atlas image for reference with respect to the patient image; and
   concurrently displaying the atlas image and the patient image.

2. The method of claim 1, further comprising registering a plurality of atlas images to a plurality of patient images.

3. The method of claim 1, further comprising synchronizing at least one of orientation, zoom level, window level and pan of the atlas image to the patient image.

4. The method of claim 1, further comprising synchronizing presentation states for the atlas image and the patient image.

5. The method of claim 1, wherein labeling further comprises automatically labeling components in the patient image based on labels in the atlas image following image registration.

6. The method of claim 5, further wherein labels are correlated by at least one of a patient level and an organ level.

7. The method of claim 1, wherein said selecting an image atlas further comprises retrieving an image atlas based on anatomy shown in the patient image.

8. The method of claim 1, wherein said selecting further comprises selecting an image atlas based on one or more characteristic.

9. The method of claim 8, wherein the one or more characteristic includes at least one of modality, patient, gender, weight, height, age, ethnicity and ailment.

10. The method of claim 1, further comprising providing clinical data based on the image atlas.

11. An image viewing system displaying a patient image with an atlas image, said system comprising:
    a viewing station for viewing a medical image, the viewing station configured to view one or more patient images in conjunction with one or more atlas images, the viewing station including a processor configured to select an image atlas based on a patient image study to be presented, the processor to register an atlas image from the image atlas to a patient image from the patient image study, the processor to label components in the atlas image for reference with respect to the patient image, the processor to concurrently display the atlas image and the patient image, wherein the image atlas includes reference information with respect to at least one atlas image including anatomical context having multiple views of a three-dimensional dataset.

12. The system of claim 11, further comprising a reference library storing a plurality of image atlases.

13. The system of claim 12, wherein the reference library includes clinical data related to the plurality of image atlases, the processor to provide clinical data based on the at least one image atlas.

14. The system of claim 11, wherein the processor is to synchronize at least one of orientation, zoom level, window level and pan of the at least one atlas image to the at least one patient image.

15. The system of claim 11, wherein the processor is to synchronize presentation states for the at least one atlas image and the patient image.

16. The system of claim 11, wherein the processor is to label components in the at least one patent image based on labels in the at least one atlas image.

17. The system of claim 11, wherein the processor is to retrieve the image atlas based on one or more characteristic associated with the patient image and the image atlas, the one or more characteristic including at least one of anatomy, modality, patient, gender, weight, height, age, ethnicity and ailment.

18. A tangible computer readable storage medium having a set of instructions for execution on a computer, which, when executed, implement a method comprising:
    selecting an image atlas based on an image study to be presented, the image atlas comparable to the image study, wherein the image atlas includes reference information with respect to at least one atlas image including anatomical context having multiple views of a three-dimensional dataset;
    registering an atlas image from the image atlas to a patient image from the image study;
    labeling components in the atlas image for reference with respect to the patient image; and
    concurrently displaying the atlas image and the patient image.

* * * * *

UNITED STATES PATENT AND TRADEMARK OFFICE
CERTIFICATE OF CORRECTION

| | | |
|---|---|---|
| PATENT NO. | : 8,135,195 B2 | |
| APPLICATION NO. | : 13/171217 | |
| DATED | : March 13, 2012 | |
| INVENTOR(S) | : Mahesh et al. | |

It is certified that error appears in the above-identified patent and that said Letters Patent is hereby corrected as shown below:

In Column 10, Line 40, in Claim 16, delete "patent image" and insert -- patient image --, therefor.

Signed and Sealed this
Nineteenth Day of June, 2012

David J. Kappos
*Director of the United States Patent and Trademark Office*